United States Patent [19]

Bott

[11] Patent Number: 4,717,298

[45] Date of Patent: Jan. 5, 1988

[54] CARGO RESTRAINT SYSTEM

[76] Inventor: John A. Bott, 931 Lakeshore Dr., Grosse Pointe Shores, Mich. 48236

[21] Appl. No.: 815,563

[22] Filed: Jan. 2, 1986

Related U.S. Application Data

[63] Continuation-in-part of Ser. No. 745,587, Jun. 17, 1985, abandoned, which is a continuation of Ser. No. 483,227, Apr. 8, 1983, abandoned.

[51] Int. Cl.$^4$ .................. B60D 45/00; B60P 1/64; F16B 21/09
[52] U.S. Cl. ....................................... 410/129; 410/94; 410/104; 403/326
[58] Field of Search .............. 211/41, 184, 189, 208; 248/187, 221.3, 221.1, 303, 309.1; 296/39 R; 403/326, 329, 330, 398, 399; 410/94, 104, 105, 112-115, 129, 130, 135, 140, 153

[56] References Cited

U.S. PATENT DOCUMENTS

| Re. 28,788 | 4/1976 | Williamson, III | 280/179 R |
|---|---|---|---|
| 2,388,304 | 11/1945 | Ackerman et al. | 280/179 |
| 2,808,788 | 10/1957 | Stough | 410/94 X |
| 3,193,122 | 7/1965 | Sauthoff | 214/152 |
| 3,203,363 | 8/1965 | Miller | 410/135 |
| 3,229,994 | 1/1966 | Klein | 280/179 |
| 3,285,428 | 11/1966 | Scheck | 403/326 X |
| 3,428,330 | 2/1969 | Klein | 280/179 |
| 3,620,171 | 11/1971 | Brenia et al. | 105/369 A |
| 3,643,973 | 2/1972 | Bott | 280/179 R |
| 3,779,174 | 12/1973 | Doyle et al. | 105/376 |
| 3,845,601 | 11/1974 | Kostecky | 403/326 X |
| 4,049,311 | 9/1977 | Dietrich et al. | 296/24 R |
| 4,181,349 | 1/1980 | Nix et al. | 296/39 R |
| 4,185,799 | 1/1980 | Richards, Jr. | 244/118.5 R |
| 4,200,046 | 4/1980 | Koliba et al. | 410/94 |
| 4,278,376 | 7/1981 | Hunter | 410/130 |
| 4,341,412 | 7/1982 | Wayne | 296/39 R |
| 4,500,020 | 2/1985 | Rasor | 410/105 X |
| 4,507,033 | 3/1985 | Boyd | 410/104 |

FOREIGN PATENT DOCUMENTS 1161214  8/1958  France .................. 410/105

Primary Examiner—Robert B. Reeves
Assistant Examiner—John G. Pido
Attorney, Agent, or Firm—H. Keith Miller

[57] ABSTRACT

A cargo restraint system for the bed of a truck comprising primary cargo securing element and cargo securing members clampingly engageable with the primary cargo securing element. A bed liner may also be included in the combination. Abutment dual tie down members are also readily utilizeable with the system to provide improved cargo restraint. An elongated stop block may be releasably assembled into brackets clampingly engaged for adjustable movement on a pair of primary securing elements as part of a multi-faceted, but easily disassembled system for cargo restraint for use in trucks, vans, station wagons and the like.

5 Claims, 9 Drawing Figures

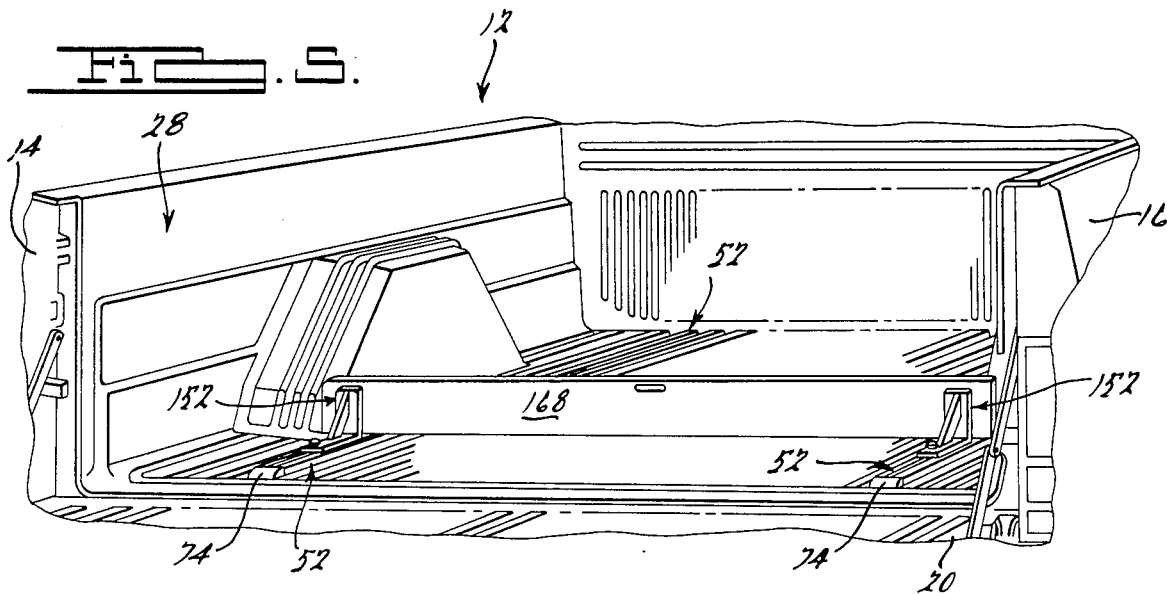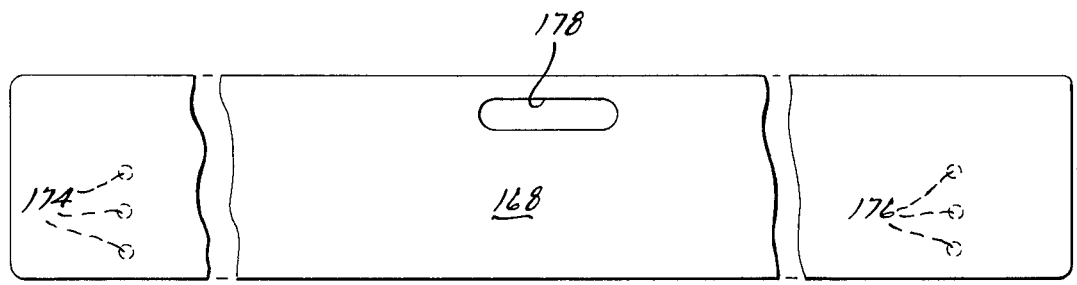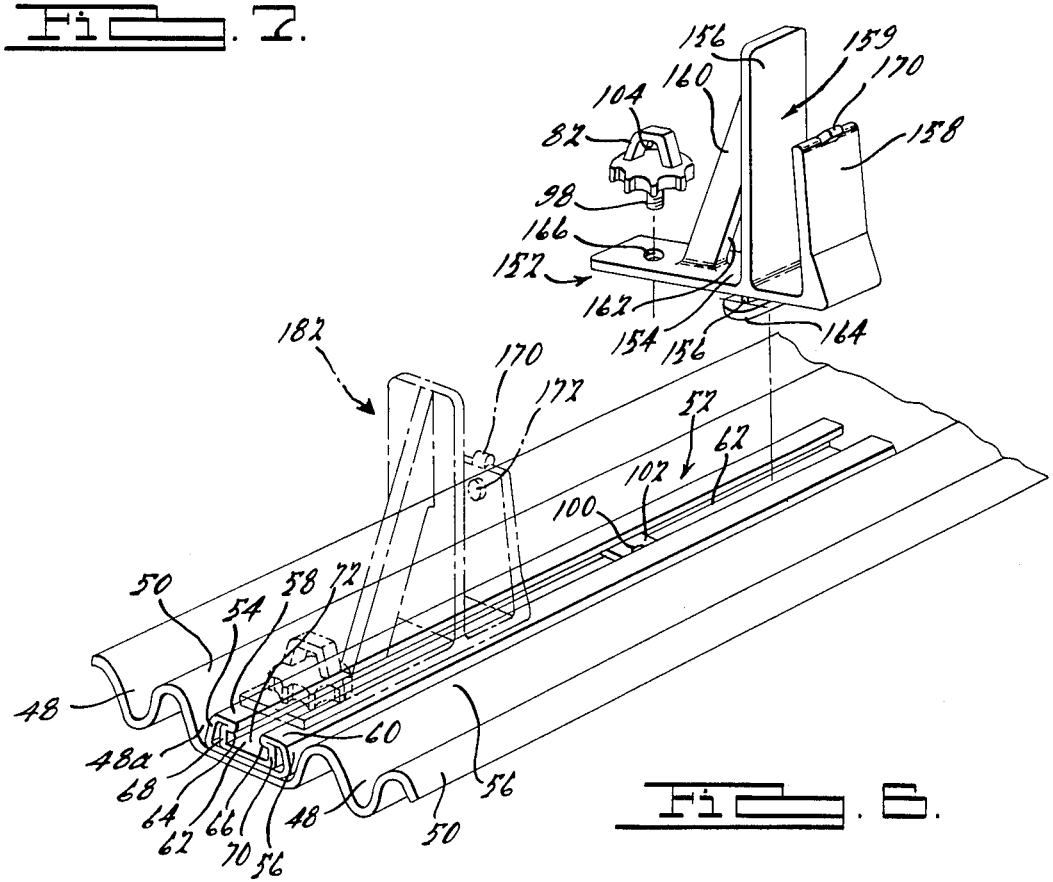

CARGO RESTRAINT SYSTEM

CROSS-REFERENCE TO RELATED APPLICATIONS

This is a continuation-in-part of Ser. No. 745,587, filed June 17, 1985, now abandoned, which is a continuation of Ser. No. 483,227, filed Apr. 8, 1983, now abandoned.

BACKGROUND AND SUMMARY OF THE INVENTION

The present invention relates generally to restraint systems for cargo on trucks and similar cargo transporting vehicles having designated cargo carrying space and more particularly to a system for restraining cargo in the bed of a truck such as a pick-up truck or the like or the interior load carrying portion of a van or station wagon.

Truck beds are subject to substantial amounts of wear and tear due to the nature of the various types of cargo carried, the lack of care utilized by those placing the cargo in the bed and withdrawing it from the bed, and various environmental effects. Reconstruction of the truck bed is a substantial and costly procedure usually resulting in retirement of the entire vehicle.

Furthermore, cargo restraint systems for truck beds, vans, and station wagons generally are limited by the nature of the cargo believed to be utilized. With pick-up trucks and similar load carrying vehicles, cargo is generally variable in size and a multi-faceted, multi-purpose cargo restraint system is believed to be highly valuable. With the ever increasing use of pick-up trucks, vans, station wagons, and the like which also have other day-to-day uses, such as commuting to and from work, for which some aesthetic appeal is desirable, a means of retaining aesthetic appeal in the vehicle used is also significant.

Accordingly, in the present invention, a cargo restraint system is presented which may incorporate a liner for the bed of a truck into an improved restraint system for the cargo in the bed. Primary cargo restraining elements which are capable of clamping engagement with various cargo securing devices are implemented in the truck bed on the liner. The liner may have recesses in which the primary elements may be disposed wherein the cargo is supported on the upper surfaces of the bed liner so that the liner may bear the wear or other effects caused by movement of the cargo. The liner, of course, is wear-resistant and puncture-resistant, but is also readily replaceable without impairment of the structure of the underlying truck bed. The primary elements may also be mounted in a manner wherein the primary elements themselves have cargo supporting surfaces either in the same horizontal plane as the support surfaces of the bed liner or above the horizontal plane of the bed liner support surfaces. With any of the above alternatives, the bed liner may also utilize recesses as both drainage elements and also to lower the frictional interface between the cargo and the cargo support surfaces as the cargo is moved across the bed.

Additionally, the cargo restraint system may be mounted directly to the truck bed or mounted in the interior of a van or station wagon. If so mounted, various cargo securing or load supporting elements may be utilized with the primary elements of the cargo restraint system.

Various cargo securing elements clampingly engageable to the primary element and tailored to the loads carried in the bed are also disclosed here as part of the present invention. Particularly noteworthy cargo securing elements are illustrated here which have ease of operation yet flexibility and control in cargo securing and which are not shown by the prior art (such as U.S. Pat. No. 4,278,376, issued July 14, 1981) due to the multi-faceted uses of the various elements of the present system, the ease of use of the present system, and other advantages as set forth below. The present invention includes a cargo restraint system that has readily releasable components to make the system and the cargo restrained in the system easy to set up, use, adjust, modify, and/or disassemble as desired without interfering with the other functions of the load storage area of a vehicle. The components of the system themselves are also modifiable for various uses.

Other objects and advantages of the present invention will become apparent from the following detailed description taken in conjunction with the accompanying drawings.

BRIEF DESCRIPTION OF THE DRAWINGS

FIG. 5 is a view similar to FIG. 1 of an alternative embodiment of the system of the present invention;

FIG. 6 is an exploded perspective view of a portion of the system of FIG. 5;

FIG. 7 is an elevational view of the elongated stop member of FIG. 5;

DETAILED DESCRIPTION OF THE PREFERRED EMBODIMENTS

Figure 1:
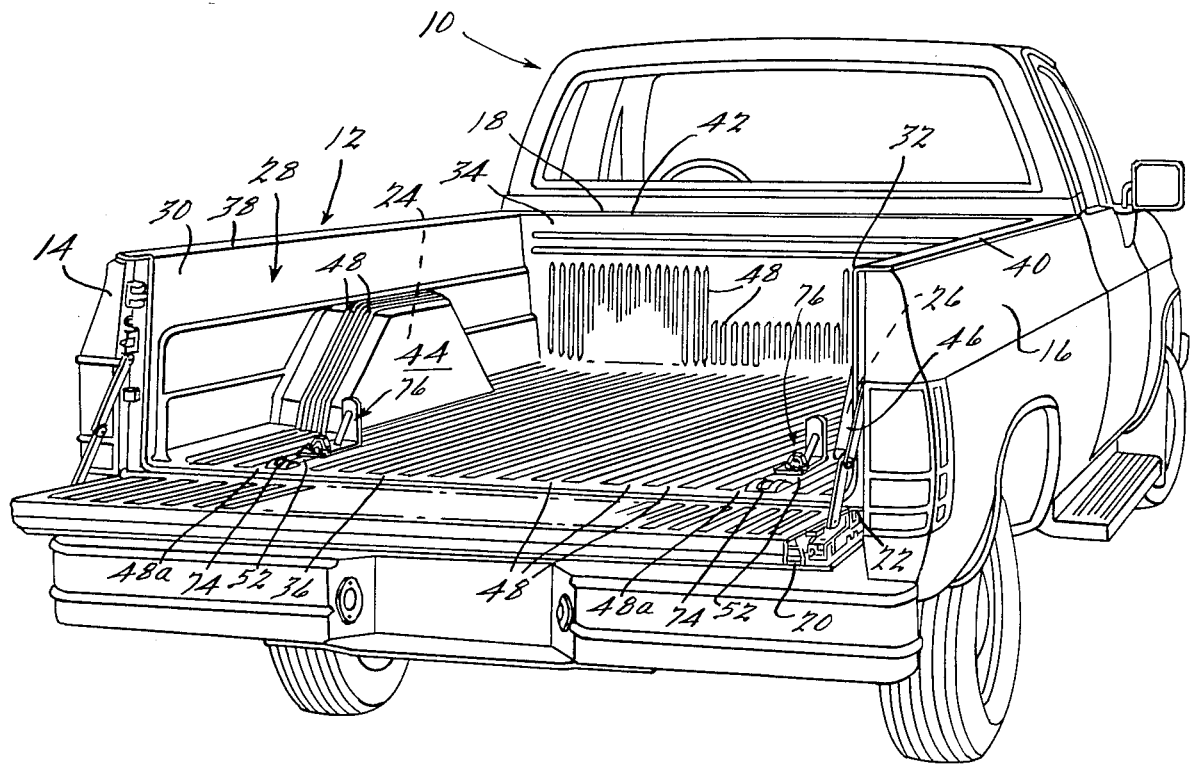
FIG. 1 is an elevated perspective view of the rear of a pick-up truck having the present invention installed in the bed of the truck.

Referring to FIG. 1, a pick-up truck 10 is illustrated having a cargo bed portion 12 comprised of two side walls 14 and 16, a forward wall 18, a tailgate 20, and a floor 22. Portions of the side walls 14 and 16 comprise wheel wells 24 and 26.

A bed liner 28 is set within and secured to the truck bed 12 by suitable fasteners. The liner 28 is shaped to correspond to the shape of the bed 12 and has corresponding side walls 30 and 32, forward wall 34 and a base 36 to cover the bed floor 22. Outwardly directed flanges 38, 40, and 42 extend from the upper edge of the side walls 30 and 32 and forward wall 34, respectively, to overlap the top portion of the walls 14, 16, and 18 of the bed 12 and also conform and align the liner 28 to the truck bed 12. The conformance and alignment function is also provided by the wheel well cover portions 44 and 46 of the bed liner side walls 30 and 32, respectively.

Figure 3:
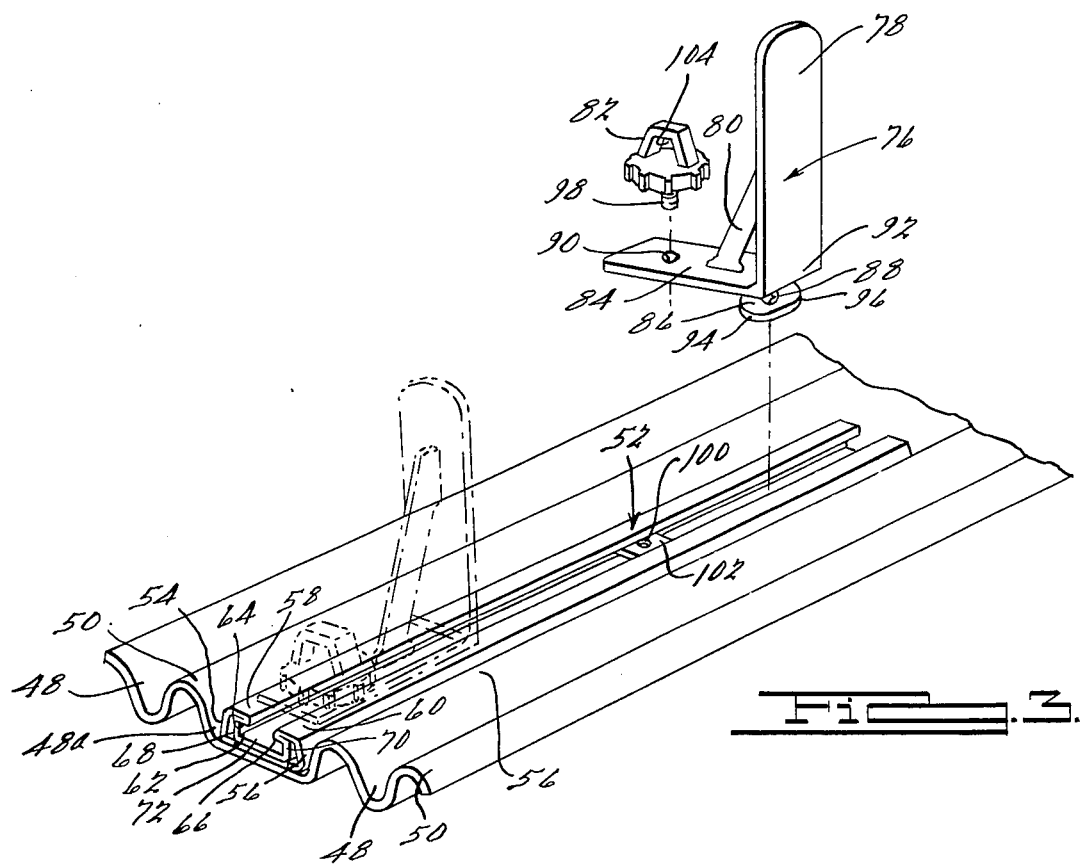
FIG. 3 is an exploded perspective view of a portion of the cargo restraint system of FIGS. 1 and 2.

The liner 28 is constructed of a moldable polymeric material with suitable wear characteristics to withstand frictional movement of heavy objects thereon and also withstand piercing by sharp edges or corners of certain objects when moved or disposed on the liner. Recesses, in the form of grooves 48 in this embodiment, may be disposed throughout the liner to lower the amount of surface area and also provide for drainage of fluid from the liner. This is particularly noteworthy in the base 36 of the liner 28, as illustrated in more detail in FIG. 3, where grooves 48 are shown with cargo supporting surfaces 50 disposed between the grooves 48. The grooves 48 need not be uniform in any manner, although the construction shown in FIG. 3 is generally preferred. FIG. 3 also illustrates that at least one of the recesses or grooves 48 is constructed as shown at recess 48a to incorporate the liner 28 as an element of a cargo restraint system by incorporating a further element of the system into the liner.

A primary cargo element 52 is secured to the liner 28, either individually as an assembly or to the truck bed 12 through the liner, by suitable fasteners (not shown). The element 52 is comprised of two side walls 54 and 56, two upper surfaces 58 and 60 inwardly directed from the side walls, and means for clampingly engaging a further second cargo securing device of the cargo restraint system to the element 52 comprising in this instance a T-slot channel 62 comprised of longitudinally extending clamping surfaces 64 and 66 interiorly of the element 52, along with interior side walls 68 and 70 and base 72, which walls and base may also be utilized as clamping surfaces with other types of clamping mechanisms. The element 52 may also include a suitable end cap 74 (FIG. 1) at one end or both ends thereof.

The upper surfaces 58 and 60 of the primary cargo restraining element 52 are generally cargo supporting surfaces in those similarly constructed elements utilized with luggage carriers on automobiles and designated as slats, and may also be used as such here if the recesses or grooves 48a are constructed of a depth less than the depth of the element 52 or if the element 52 is otherwise mounted on the liner 28 so that the plane formed by the upper surfaces 58 and 60 is the same as or vertically elevated from a plane formed by support surfaces 50 of the base 36 of the liner 28. It is preferred, however, that the upper surfaces 58 and 60 of the element 52 be disposed in a plane below a plane formed by the support surfaces 50 of the base 36 of the liner 28 to reduce the wear on the element 52 and potentially extend the useful life of the entire cargo restraint system.

Figure 2:
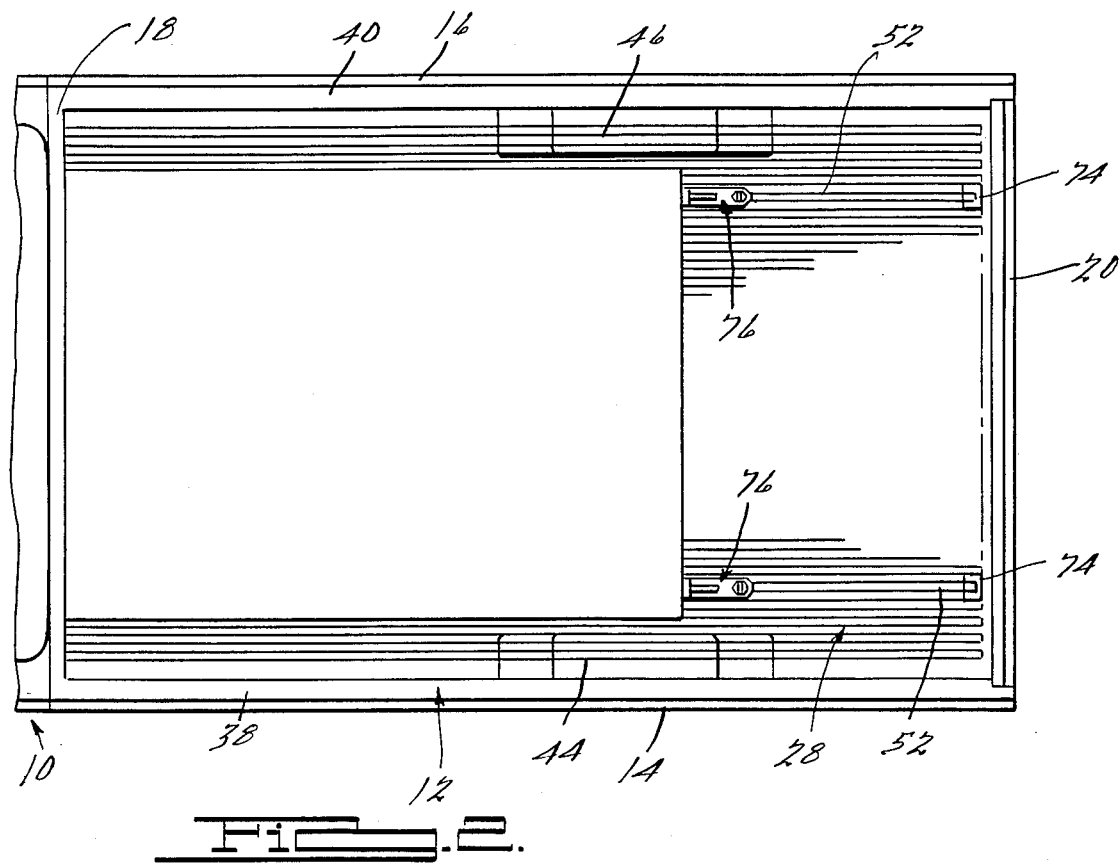
FIG. 2 is a plan view of the bed of the truck of FIG. 1 with cargo loaded in the bed.

In combination with the element 52 and the liner 28, various cargo securing devices may be utilized that are clampingly engageable with the primary element 52. FIGS. 1 to 3 illustrate a cargo securing device comprising a tie down/positioning member 76 having an abutment portion 78, a first tie down portion 80 and a second tie down 82. The abutment portion 78 has a vertically disposable abutment surface and forms an angle, here a right angle, with a horizontally extending base 84 of the device 76. The first tie down portion 80 extends between the abutment portion 78 and said base 84 and buttresses the abutment portion 78. The base 84 includes a key 86 integrally associated with the base 84 via an integrally associated guide element 88 which has a thickness less than the key portion. An aperture 90 is disposed near the end of the base 84 opposite the end 92 with which the vertically disposed portion 78 and the key 86 are operably associated.

Referring to FIG. 3, the tie down/positioning member 76 is disposed in the primary element 52 by turning the longitudinal axis of the base 84 perpendicularly to the longitudinal axis of the primary element channel 62 so that the key 86 may be disposed therein. The width of the key 86 is less than the width of the opening of the channel 62. The member 76 is then turned so that the longitudinal axis of the base 84 is parallel to the longitudinal axis of the primary element channel 62 so that the ends 94 and 96 of the key 86 are disposed with the channel 62. The length between the ends 94 and 96 of the key 86 is greater than the width of the opening of the channel 62. A threaded stud portion 98 extends downwardly from the second tie down member 82 is insertable through aperture 90 into engagement with a threaded aperture 100 in a clamping element 102 within the channel 62 of the primary element 52. The tie down/positioning member 76 may be slidably adjusted to any desired position along the length of the primary element 52 at which point the threaded second tie down member 82 is threadably secured to the clamping element 102 to securely engage the tie down/positioning member 76 in position by manual engagement of the second tie down member 82. Once the series of members 76 are engaged in desired positions, rope spider connectors, elastic hook connectors, or the like may be secured to either the loop 104 of the threaded tie down member 82 or the first tie down 80 of the tie down/positioning member 76 to secure cargo articles to the truck bed 28.

As illustrated in FIG. 2, mere abutment by the members 76 may be sufficient for certain loads and the walls of the truck bed can be readily incorporated into the cargo restraint system for this purpose.

Figure 4:
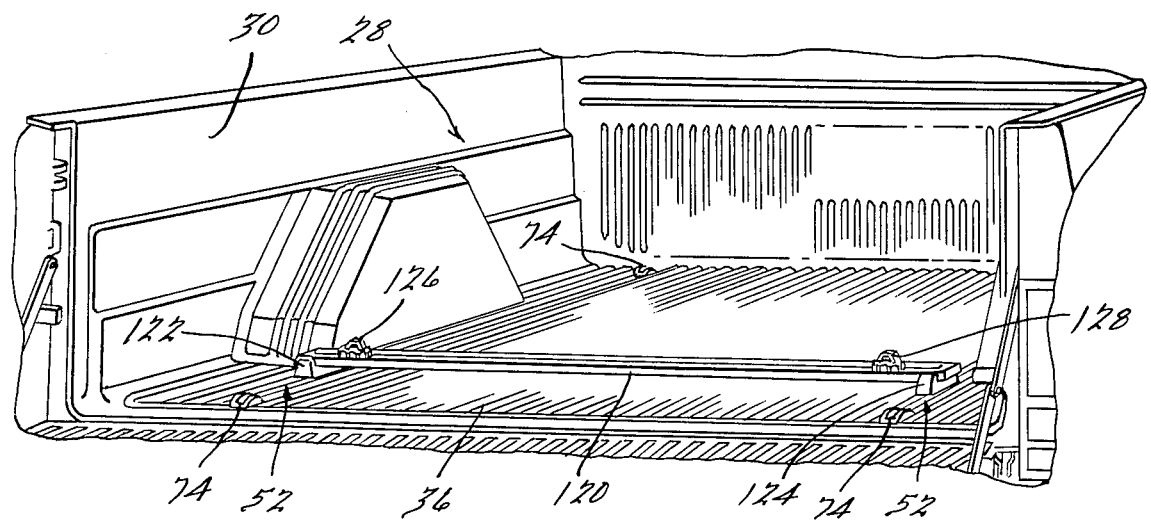
FIG. 4 is a view similar to FIG. 1 with a different cargo restraint element implemented in the system.

A further alternative is illustrated in FIG. 4 where an elevated cross rail 120 is disposed on brackets 122 and 124 which brackets have suitable means for clampingly engaging the primary elements 52. Tie downs 126 and 128 may be adjustably positioned both in the cross rail 120 and also in the primary element 52 (not shown). Various other cargo securing elements, such as utility bores, various types of tie down members, and various other brackets may also be clampingly secured to the primary element 52 to be included as part of the system of the present invention.

An additional alternative embodiment is illustrated as the cargo restraint system 150 of FIG. 5. The system 150 includes the same primary cargo securing element 52 as the prior embodiments and may be optionally associated with a truck bed liner 28. A cargo securing bracket 152 is clampingly engageable with the primary element 52 comprising a horizontally extending base 154 from which first 156 and second 158 vertically disposed supports extend upwardly to form a slot 159. The first support 156 is integrated with a buttress 160, which buttress 160 is also integrated with the base 154 to form a tie down portion 162. The base 154 includes a key 164 integrally associated with the base 154 by an integrally associated guide element 156 having a thickness less than the key 164 and also less than the distance between the upper surfaces 58 and 60 of the primary element 52 which distance is also the width of the opening to the channel 62. The length of key 164 is greater than the width of the opening to the channel 62 and the width of the key 164 is less than the width of the opening to the channel 62 so that, as shown in FIG. 6, the bracket 152 may be disposed at a right angle of the primary element 52 to permit insertion of the key 164 into the channel 62 of the primary element 52. Then the bracket 152 is rotated 90 degrees to secure the bracket 152 slidably within the channel 62 of primary element 52.

The base 154 of the bracket 152 also includes an aperture 166 through which a second tie down member 82, as described above, can be inserted and threadably engage a threaded aperture 100 in a clamping element 102 disposed within the channel 62 of the primary element 52, as described above. The bracket 152 may be slidably adjusted to any desired position along the length of the primary element 52 at which point the threaded second tie down member 82 is threadably secured to the clamping element 102 to securely lock the bracket 152 in position.

As shown in FIG. 5, use of at least two of the brackets 152 permits a stop block 168 to be readily implemented into the system. The second vertically disposed support 158 includes a releasing flange 170 canted away from the slot 159 at the upper end of the support and a lug 172 directed inwardly into the slot 159. The stop block 168 is inserted into the slot 159 of each bracket 152 once the brackets 152 are laterally aligned on the primary elements 52. The block 168 has a series of recesses 174 and 176 which cooperate with the lug 172 of each bracket 152 to secure the block 168 in position. The second vertical support 158 has a limited degree of flexion to permit the stop block 168 to be forced over the lug 172 until an aperture 174 or 176 is associated with the lug 174 or 176, at which point the second vertical support 158 will spring back to its vertical position. If the stop block 168 is to be moved vertically or otherwise released, the releasing flange permits movement of the second vertical support 158 and the lug 172 away from the stop block 168. A handle 178 formed by an aperture in the block aids in the movement of the block.

Figure 8:
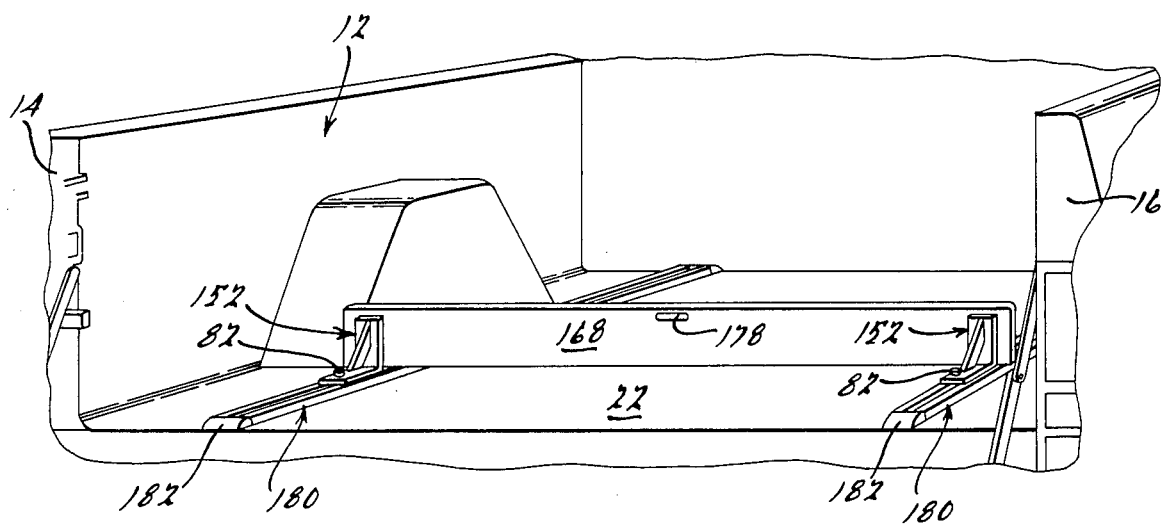
FIG. 8 is a view similar to FIG. 1 illustrating the present system in a truck bed without a liner.
Figure 9:
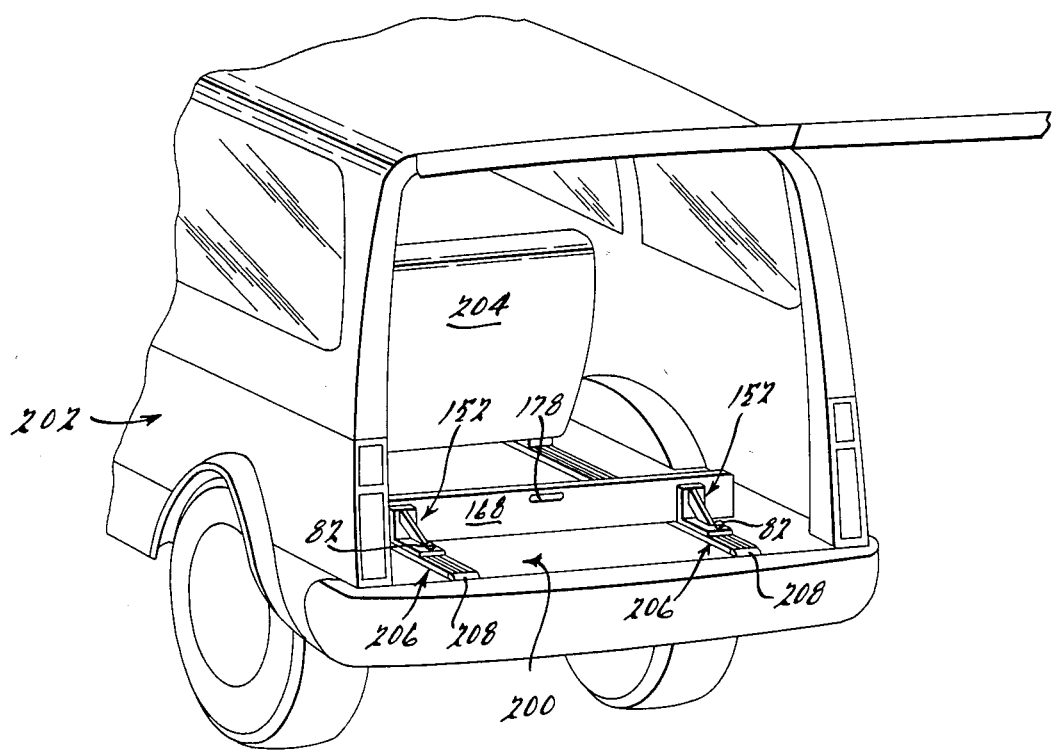
FIG. 9 is a view similar to FIG. 1 illustrating the present system in a van, station wagon, or hybrid thereof.

FIGS. 8 and 9 illustrate that the present invention can be utilized without a bed liner and also interiorly of a cargo carrying vehicle such as a station wagon, van, or hybrid vehicle once the primary elements 52 are suitably secured. Referring to FIG. 8, the cargo bed portion 12 has no bed liner. The primary elements or slats 180 and end caps 182 are secured by screws or other suitable fasteners directly to the floor 22 of the cargo bed portion 12. The brackets 152 and stop block 168 are then releasably secured to the primary elements or slats 180 as set forth above.

As shown in FIG. 9, the primary elements are used with the floor 200 of a station wagon or van 202 and may also have concurrent multiple uses such as for attachment of a seat 204 in addition to adjustably securing a stop block 168. In such an enclosed storage area, the components of the system may be readily disassembled and removed to return the area to its normal uses, such as for seating, or to return the area to one with no storage functions at all, as desired. Again the primary elements or slats 206 are secured to the floor 200, along with end caps 208 by conventional fasteners and the brackets 152 are secured to the primary elements or slats 206 as described above with the stop block 168 operably associated with the brackets 152 as set forth above. The seat 204 may be operably clamped to the primary elements or slats 206 by any conventional means.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A cargo restraint system comprising
a pair of slat elements; and
at least one cargo restraining member substantially disposed between said slats and including means for being clampingly engaged with each of said slats to restrain a load at any point along the length of each of said slats, said member being comprised of a pair of end brackets each having a slot therein formed of two walls and a base and an elongated element disposed between said brackets and into said slots, said elongated element being removable from said brackets, wherein at least one of said brackets includes means for locking said bracket and elongated element together, comprising a fixed lug on one of said elongated element or one wall of said at least one bracket and a recess in the other of said elongated element or one wall of said at least one bracket, wherein said fixed lug is insertable in said aperture to positively lock said elongated element within said slot of said at least one bracket.

2. A system in accordance with claim 1, wherein a pair of lugs is disposed on one of said elongated element or one on each of said brackets and at least two recesses are diposed on the other of said elongated element or one on each of said brackets.

3. A system in accordance with claim 1, wherein said at least one of said brackets includes means for biasing said locking means into and out of locking engagement between said bracket and said elongated element.

4. A system in accordance with claim 1, wherein said bracket further comprises first tie down means integral with said bracket.

5. A system in accordance with claim 4, wherein said clampingly engaging means includes a second tie down element.

* * * * *